US008064118B2

(12) United States Patent
Ishii et al.

(10) Patent No.: US 8,064,118 B2
(45) Date of Patent: Nov. 22, 2011

(54) CONTROL SYSTEM FOR MICROMIRROR DEVICE

(75) Inventors: Fusao Ishii, Menlo Park, CA (US); Yoshihiro Maeda, Hachioji (JP); Hirotoshi Ichikawa, Hchioji (JP); Kazuma Arai, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 322 days.

(21) Appl. No.: 11/881,294

(22) Filed: Jul. 26, 2007

(65) Prior Publication Data

US 2008/0024856 A1      Jan. 31, 2008

Related U.S. Application Data

(60) Provisional application No. 60/834,119, filed on Jul. 27, 2006.

(51) Int. Cl.
*G02F 1/03* (2006.01)
*G02B 26/00* (2006.01)
(52) U.S. Cl. .................. 359/245; 359/237; 359/290
(58) Field of Classification Search ............ 359/245, 359/290–292, 295, 223–225, 243, 260–263, 359/298, 198, 301–303, 317–318, 237, 242
See application file for complete search history.

(56) References Cited

U.S. PATENT DOCUMENTS

| 4,769,713 | A | 9/1988 | Yasui |
| 5,287,096 | A | 2/1994 | Thompson et al. |
| 5,619,228 | A | 4/1997 | Doherty et al. |
| 5,686,939 | A | 11/1997 | Millward et al. |
| 5,767,828 | A | 6/1998 | McKnight |
| 5,969,710 | A | 10/1999 | Doherty et al. |
| 5,986,640 | A | 11/1999 | Baldwin et al. |
| 6,064,366 | A | 5/2000 | Millward et al. |
| 6,999,224 | B2 | 2/2006 | Huibers |
| 2002/0036611 | A1* | 3/2002 | Ishii ........................ 345/89 |
| 2005/0105008 | A1 | 5/2005 | Doyen et al. |

* cited by examiner

*Primary Examiner* — Dawayne Pinkney
(74) *Attorney, Agent, or Firm* — Bo-In Lin

(57) ABSTRACT

This invention provides a display system that receives an image signal containing a binary data of N bits, wherein N is a positive integer, for displaying an image with a grayscale corresponding to the binary data. The display system further includes a data converter for converting M-bit of the N bits of the binary data into a non-binary data, wherein M is a positive integer and N≧M, for applying the non-binary data as a sub-frame in controlling the gray scale in displaying the image. In an exemplary embodiment, the data converter converts consecutive M-bit of the N bits of the binary data into the non-binary data. The display system further includes a spatial light modulator (SLM) having a plurality of pixel elements and the SLM receiving the non-binary data of M bits for controlling the pixel elements.

12 Claims, 19 Drawing Sheets

CONTROL SYSTEM FOR MICROMIRROR DEVICE

This application is a Non-provisional application of a Provisional Application 60/834,119 filed on Jul. 27, 2006. The Provisional Application 60/834,119 is a Continuation in Part (CIP) Application of a pending U.S. patent application Ser. Nos. 11/121,543 filed on May 4, 2005. The application Ser. No. 11/121,543 is a Continuation in part (CIP) application of three previously filed applications. These three applications are Ser. No. 10/698,620 filed on Nov. 1, 2003, Ser. No. 10/699,140 filed on Nov. 1, 2003, and Ser. No. 10/699,143 filed on Nov. 1, 2003 by one of the Applicants of this patent application. The disclosures made in these patent applications are hereby incorporated by reference in this patent application.

TECHNICAL FIELD

The present invention relates to an image display system. Particularly, the present invention relates to a display system with spatial light modulator(s).

BACKGROUND ART

Even though there are significant advances made in recent years on the technologies of implementing electromechanical micromirror devices as spatial light modulator, there are still limitations and difficulties when the image display system implements the electromechanical micromirrors as spatial light modulator to provide high quality images display. Specifically, when the micromirrors are implemented as the spatial light modulator for a color sequential display system to project the display images, the images have an undesirable "rainbow" effect.

Particularly, the rainbow effects become even more pronounced in the display system based on the HDTV format. The HDTV display format becomes popular while the image size for display on a screen becomes ever bigger such as exceeding 100" in diagonal size. The pixel size on the screen is more than 1 mm when specification is that 100"-size image includes 1920×1080 pixels. Similarly for image displayed on a screen of 50" diagonal-size according to the XGA format, the pixel size is also 1 mm. For such larger size of display pixels, an observer can see each of the pixels on the screen. For these reasons, the display systems require a high number of gray scales of more than 10 bit or 16 bit in order to eliminate the rainbow effect to provide a high quality display system. Furthermore, when the display images are digitally controlled, the image qualities are adversely affected due to the fact that the image is not displayed with sufficient number of gray scales.

Electromechanical micromirror devices have drawn considerable interest because of their application as spatial light modulators (SLMs) that can be conveniently digitally controlled. A spatial light modulator requires an array of a relatively large number of micromirror devices. In general, the number of devices required ranges from 60,000 to several millions for each SLM. Referring to FIG. 1A for a digital video system 1 disclosed in a reference U.S. Pat. No. 5,214,420 that includes a display screen 2. A light source 10 is used to generate light energy as an illumination light source for displaying an image on a display screen 2. The light 9 projected from the light source is further focused and directed toward a lens 12 by a mirror 11. Lenses 12, 13 and 14 function as a beam columnator to columnate the light 9 into a column of light 8. A spatial light modulator 15 is controlled by a computer through data transmitted over a data cable 18 to selectively redirect a portion of the light from a path 7 toward a lens 5 to displaying on a screen 2. The SLM 15 has a surface 16 that includes an array of switchable reflective elements, e.g., micromirror devices 32, such as elements 17, 27, 37, and 47 as reflective elements attached to a hinge 30 shown in FIG. 1B. When element 17 is in one position, a portion of the light from the path 7 is redirected along a path 6 to lens 5 where it is enlarged or spread along a path 4 to impinge on the display screen 2 so as to form an illuminated pixel 3. When element 17 is in another position, the light directed away from the display screen 2 and hence pixel 3 is dark.

The on- and off-states of micromirror control scheme as implemented in the U.S. Pat. No. 5,214,420 and by most of the conventional display system impose a limitation on the quality of the display. Specifically, an application a conventional configuration of a control circuit is faced with a limitation that the gray scale of conventional system with the micromirrors controlled by applying a pulse-width modulation (PWM) between an ON and OFF states, is limited by the minimum controllable amount of incremental illumination determined by the LSB (least significant bit, or the least pulse width). Due to the On-Off states implemented in the conventional systems, there is no way to provide shorter pulse width than LSB. The least amount of incremental brightness controllable by the spatial light modulator determines the resolution of the gray scale and that in turn is determined by the light reflected during the length of time controlled by the least pulse width. The limited gray scales lead to degradations of image display.

Specifically, FIG. 1C shows an exemplary circuit diagram of a prior art control circuit for a micromirror according to a U.S. Pat. No. 5,285,407. The control circuit includes memory cell 32. Various transistors are referred to as "M*" where "*" denotes a transistor number and each transistor is an insulated gate field effect transistor. Transistors M5 and M7 are p-channel transistors; and transistors, M6, M8, and M9 are n-channel transistors. The capacitances C1 and C2 represent the capacitive loads presented to memory cell 32. Memory cell 32 includes an access switch transistor M9 and a latch 32a, which is the basis of a static random access switch memory (SRAM) design. Each of the access transistors M9 in a row receives a DATA signal from a different bit-line 31a. Turning on a row select transistor M9 by using the ROW signal applied to a wordline enables an operation for writing data to the memory cell 32. Latch 32a is formed from two cross-coupled inverters, M5/M6 and M7/M8, which permit two stable states. State 1 is Node A high and Node B low and state 2 is Node A low and Node B high. The dual state switching operations are carried out by the control circuit to control the micromirrors to move to a position either at an ON or OFF angular orientation as shown in FIG. 1A. The brightness, i.e., the gray scales of display for a digitally controlled image system is determined by the length of time the micromirror stays at an ON position. The length of time a micromirror is controlled at an ON position is in turn controlled by a multiple-bit word. For simplicity of illustration, FIG. 1D shows the "binary time intervals" when controlled by a four-bit word. As shown in FIG. 1D, the time durations have relative values of 1, 2, 4 and 8 that in turn define the relative brightness for each of the four bits where the "1" is for the least significant bit and the "8" is for the most significant bit. In accordance with the control mechanism as shown, the minimum controllable difference between gray scales for showing different brightness is a brightness represented by a "least significant bit" that maintains the micromirror at an ON position.

When adjacent image pixels are displayed with a great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It was observed in an image of a female model that there were artifacts shown on the forehead, the sides of the nose and the upper arm. The artifacts are generated by a technical limitation that the digitally controlled display does not provide a sufficient number of gray scales. At the bright spots of display, e.g., the forehead, the sides of the nose and the upper arm, the adjacent pixels are displayed with visible gaps of light intensities.

As the micromirrors are controlled to have a fully ON and fully OFF positions, the light intensity is determined by the length of time the micromirror is at the fully ON position. In order to increase the number of gray scales of display, the speed of the micromirror must be increased to the extent that the digitally controlled signals can be increased to a higher number of bits. However, when the speed of the micromirrors is increased, a stronger hinge is necessary for the micromirror to sustain a required number of operational cycles for a designated lifetime of operation. In order to drive the micromirrors supported on a further strengthened hinge, a higher voltage is required. The higher voltage may exceed twenty volts and may even be as high as thirty volts. The micromirrors manufactured by applying the CMOS technologies probably is not suitable for operation at such higher range of voltages and therefore the DMOS micromirror devices may be required. In order to achieve higher degree of gray scale control, a more complicated manufacturing process and larger device areas are necessary when DMOS micromirror is implemented. Conventional modes of micromirror control are therefore faced with a technical challenge that the gray scale accuracy must be sacrificed for the benefits of smaller and more cost effective micromirror display due to the operational voltage limitations.

There are many patents related to a light intensity control. These patents include the U.S. Pat. Nos. 5,589,852, 6,232, 963, 6,592,227, 6,648,476, and 6,819,064. There are further patents and patent applications related to different shapes of light sources. These patents include the U.S. Pat. Nos. 5,442, 414, 6,036,318 and Application 20030147052. The U.S. Pat. No. 6,746,123 discloses special polarized light sources for preventing a light loss. However, these patents or patent application do not provide an effective solution to overcome the limitations caused by insufficient gray scales in the digitally controlled image display systems.

There are several patents related to display systems that apply non-binary data for image control. These patents include the U.S. Pat. Nos. 5,315,540, 5,619,228, 5,969,710, 6,052,112, 6,970,148, and US Patent Application US 2005/0190429. Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,615,595, 4,728,185, 4,767,192, 4,842,396, 4,907,862, 5,214,420, 5,287,096, 5,506,597, 5,489,952, 5,827,096, 6,064,366, 6,535,319, 6,719,427, 6,880,936, and 6,999,224. However, these inventions do not address or provide direct resolutions for a person of ordinary skills in the art to overcome the above-discussed limitations and difficulties.

Therefore, a need still exists in the art of image display systems applying digital control of a micromirror array as a spatial light modulator to provide new and improved systems such that the above-discussed difficulties can be resolved.

SUMMARY OF THE INVENTION

The present invention relates to a new display controlling system for controlling a micro-mirror array having a plurality of mirrors.

In a display system, improvements of visual image qualities are very important matters. A motion contouring and a ghost of motion image are given as these matters.

As one of measures of these matters, changes of light pattern of a frame period are effective methods.

The method for arranging positions of each bit of binary data in a frame period is known as this change of light pattern.

The present invention provides an image display system having the method for transforming a binary data of an image signal into a non-binary data.

These and other objects and advantages of the present invention will no doubt become obvious to those of ordinary skills in the art after reading the following detailed description of the preferred embodiment, which is illustrated in the various drawing figures.

BRIEF DESCRIPTION OF DRAWINGS

The present invention is described in detail below with reference to the following Figures.

DESCRIPTION OF PREFERRED EMBODIMENTS

Figure 1A:
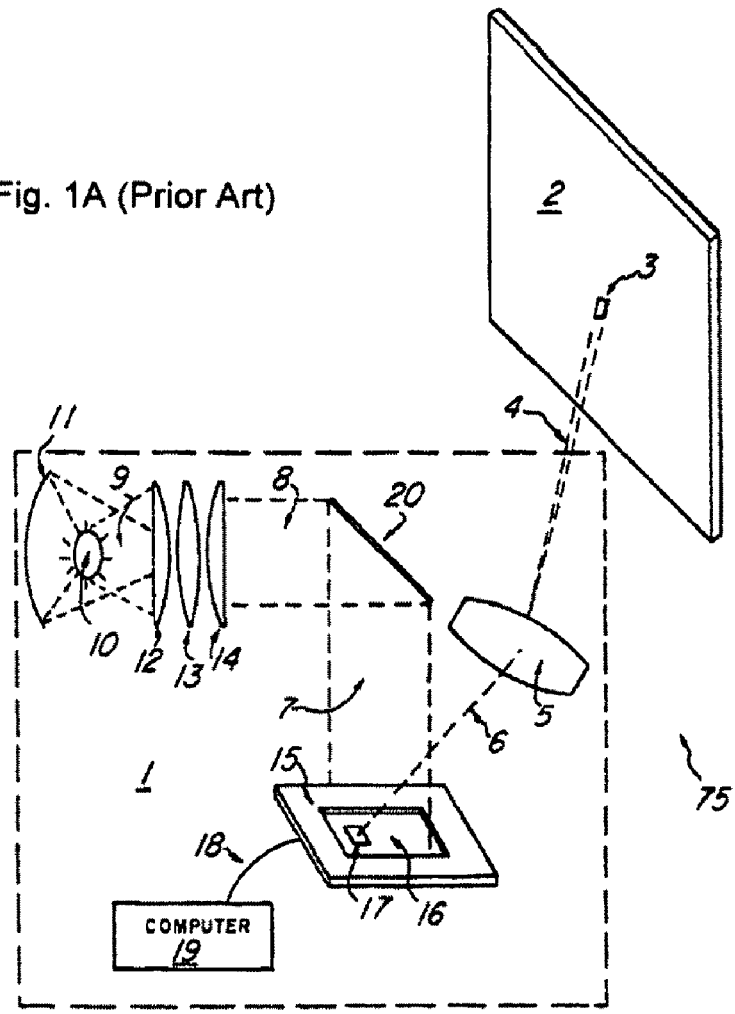
FIG. 1A is a drawing for providing background and prior art display technologies of the present invention.
Figure 1B:
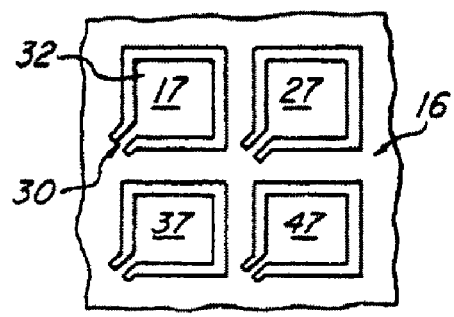
FIG. 1B is a drawing for providing background and prior art display technologies of the present invention.
Figure 1C:
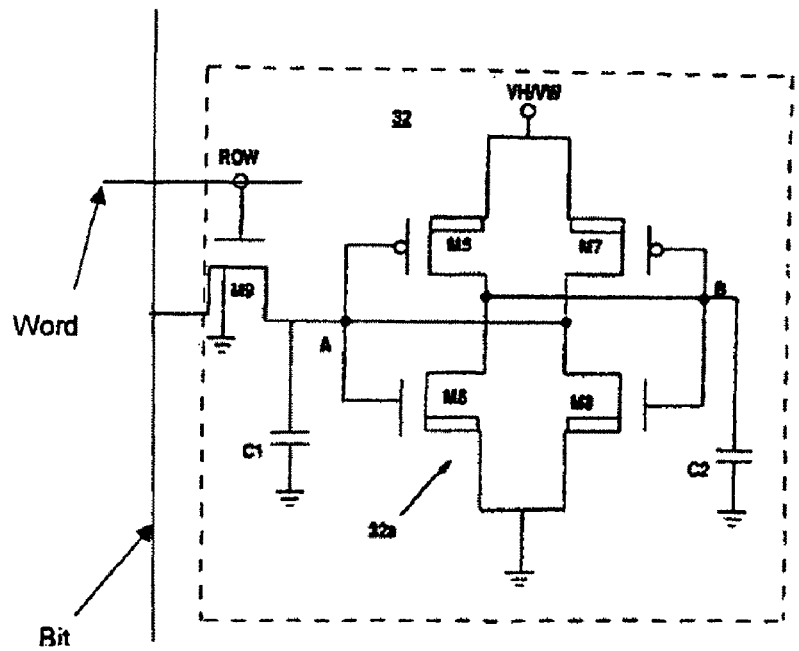
FIG. 1C is a drawing for providing background and prior art display technologies of the present invention.
Figure 1D:
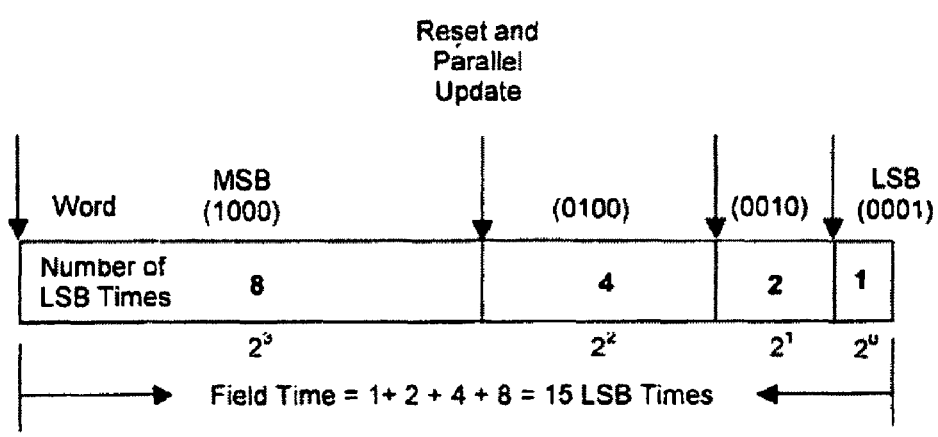
FIG. 1D is a drawing for providing background and prior art display technologies of the present invention.
Figure 2:
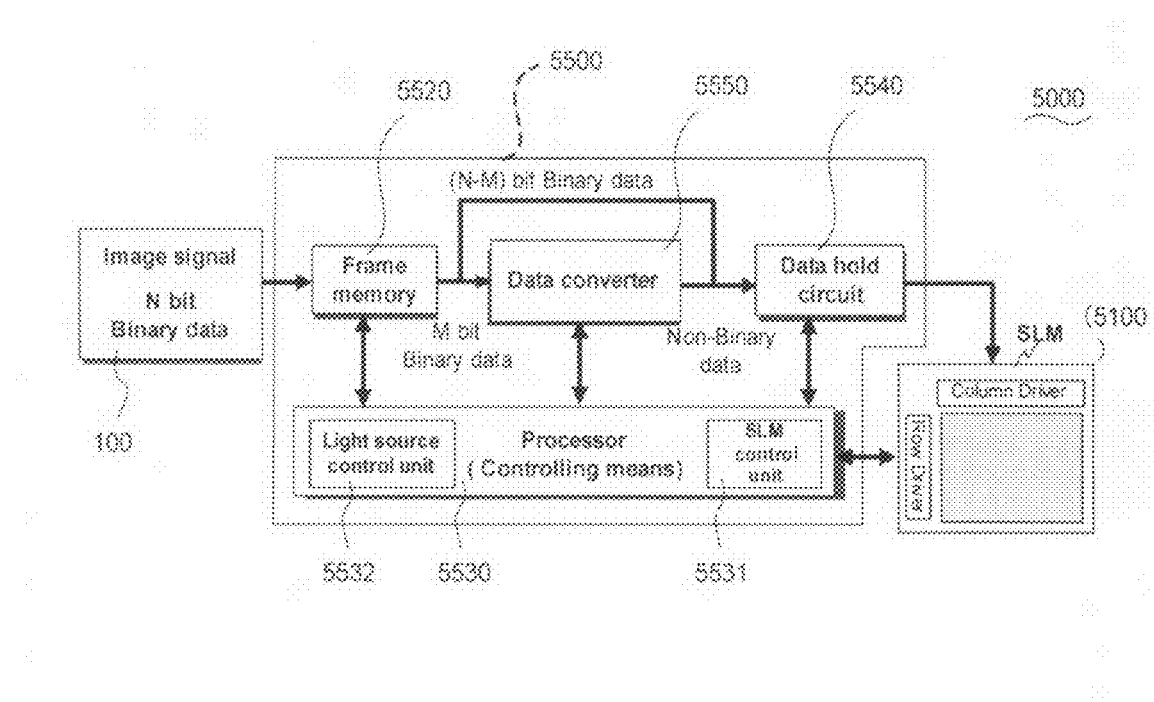
FIG. 2 is a system diagram for showing a SLM display system that has a controller to receive N-bit binary data to convert the data into non-binary data and stores the non-binary data to a data hold circuit before applying them to the SLM.

FIG. 2 is a functional block diagram for showing an exemplary embodiment of an image display system 5000 that implements an image data process technique of the present invention. The image display system comprises a plurality of spatial light modulators 5100, a control unit 5500 for controlling the modulators, a variable light source 5210 and a projection optical system 5400. The variable light source 5210 comprises a red laser light source 5211, a green laser light source 5212 and a blue laser light source 5213, emitting incident lights 5601 of the respective colors, i.e., red (R), green (G) and blue (B), to the respective spatial light modulators 5100. The control unit 5500 comprises frame memory 5520, a controller 5530, a data hold circuit 5540 and a data converter 5550. The controller 5530 includes a light source controller 5532 and an SLM controller 5531 to control the individual spatial light modulators 5100. The frame memory 5520 temporarily stores input digital video data 100 received externally as input binary data.

The SLM controller 5531 generates binary data 110 and non-binary data 210 which are control signals for controlling the ON/OFF and oscillation of each of micromirrors 5112 of the spatial light modulators 5100 based on the input digital video data 100. The video data are stored in the frame memory 5520 and sent to each of the spatial light modulators 5100 through the data hold circuit 5540. The light source controller 5532 controls the variable light source 5210 by controlling the emission intensity and emission timing of each of the red laser light source 5211, green laser light source 5212 and blue laser light source 5213.

Refer to FIG. 2 for a display system that includes a control system for controlling a spatial light modulation (SLM) device to display an image with gray scales based on binary data of image signal. The image signal includes N bits of binary data. The system further includes a data converter 5550 for converting consecutive at least M bits (N≧M) of binary data into a plurality of non-binary segmented data for each of sub-frames. The SLM has multiple pixels and is controlled by the non-binary data.

Figure 3:
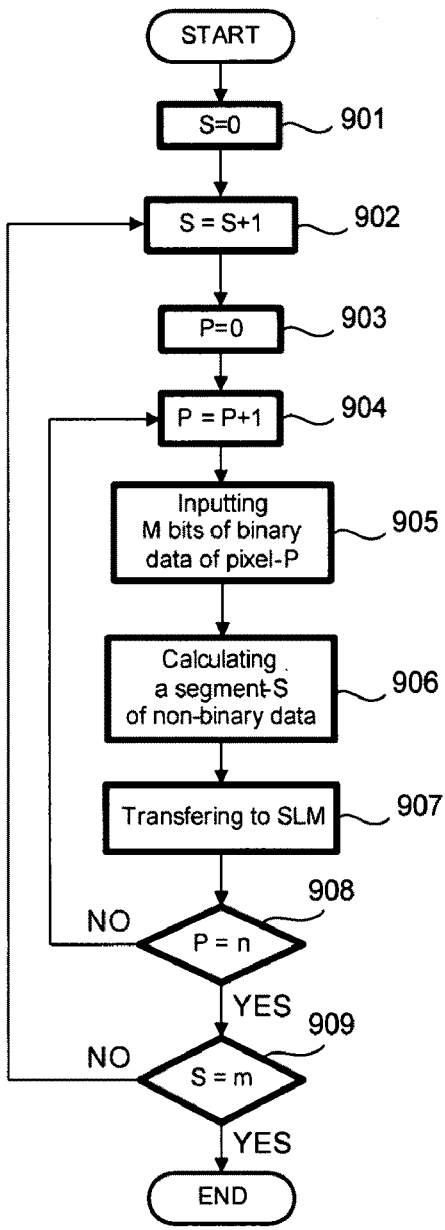
FIG. 3 is a flowchart for showing the processes carried out by the converter of FIG. 2 to convert the binary data into non-binary data.
Figure 4:
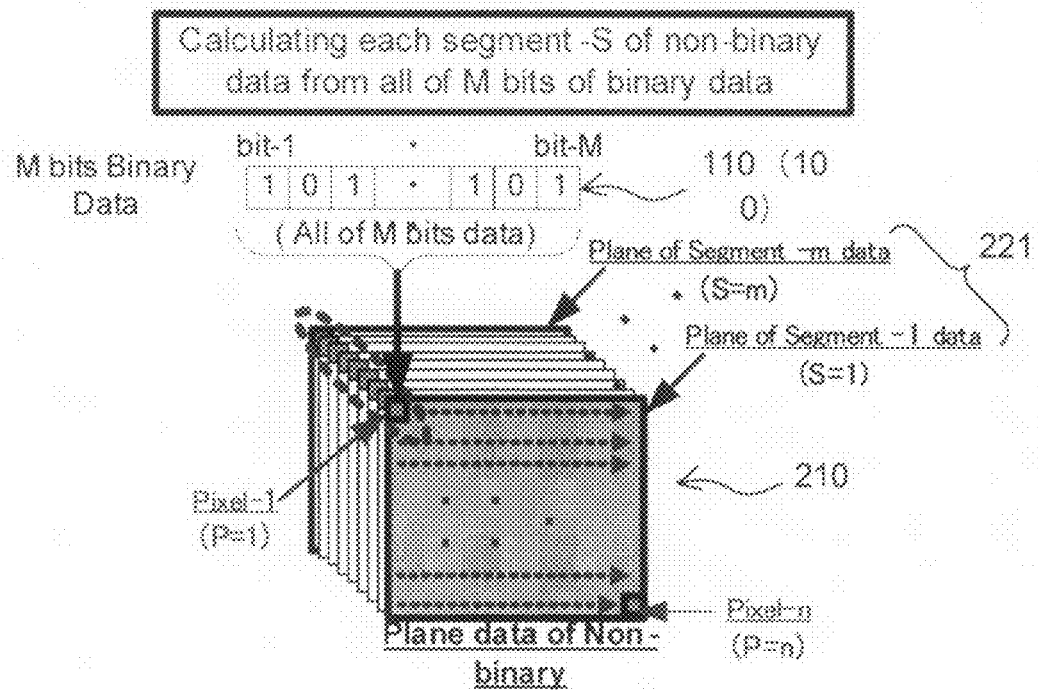
FIG. 4 is a functional diagram for showing the processes performed by the data converter for converting the data.

Refer to FIGS. 3 and 4 for the control processes carried out in the system according to the processes of the present invention. The control processes have the following characteristics, where N and M are positive integers. The processor 5530 calculates a first segment of non-binary data (i.e., the data controlling a first pixel element by a first sub-frame) from M-bit binary data corresponding to the first pixel element and transfers the data to the SLM. The processor 5530 calculates first segment data corresponding to all pixels sequentially and transfers the data to the SLM. The processor 5530 further calculates second segment data (i.e., the data for controlling each pixel) corresponding to all pixels sequentially and transfers the data to the SLM. The processes of calculating and transferring of all segmented data are repeated until the entirety of M-bit binary data is converted into non-binary data and transferred to the SLM.

The processes as described above have the advantages that the control process enables a high speed processing of all pixel elements in the time of sub-frame corresponding to non-binary data. Furthermore, the data converter 5550 does not require a large memory space to hold non-binary data as a result of converting binary data into non-binary data. The data converter 5550 of the control unit 5500 according to the present embodiment is configured to carry out the process for converting digital video data 100 (i.e., binary data) into non-binary data 210 in the procedure of the flow chart shown in FIG. 3.

Specifically, the data converter 5550 first initializes a plane number S to "0" (step 901), followed by incrementing the plane number S (step 902) Then, it initializes a pixel number P to "0" (step 903) and increments the pixel number P (step 904). Then, it inputs M-bit binary data 110 corresponding to the current pixel number P (step 905), followed by calculating non-binary data 210 from the binary data 110 of the plane number S (step 906) and transferring the calculation result to the spatial light modulators 5100 (step 907). It repeats the process until the pixel number P reaches at "n" (step 908). Then, if the pixel number P reaches at "n", the data converter 5550 determines whether or not the plane number S has reached at the number of planes m (step 909) and, if it has not reached, repeats the step 902 and thereafter.

Figure 5:
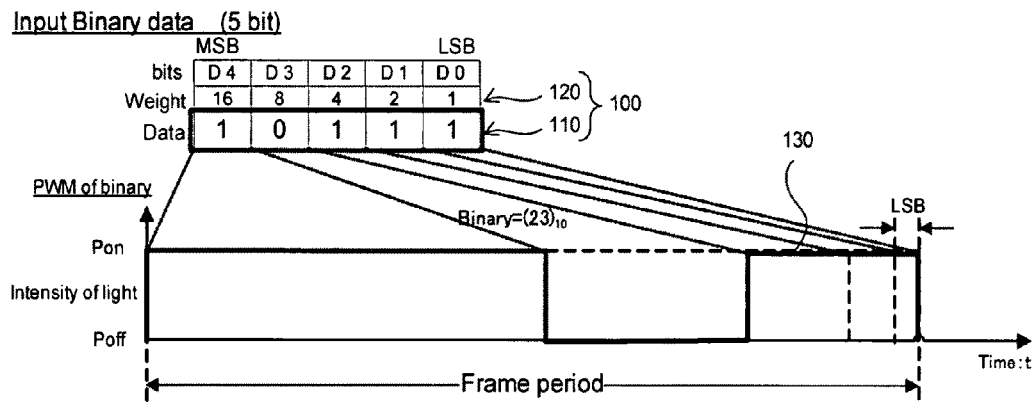
FIG. 5A is a data block diagrams for showing the binary mirror control signal using PWM.
FIG. 5B is a data block diagrams for showing the conversion of the binary data into the segmented non-binary data.
FIG. 5C is a data block diagrams for showing the partial conversion of the binary data into the segmented non-binary data and controlling the light pattern for an image display.
Figure 5:
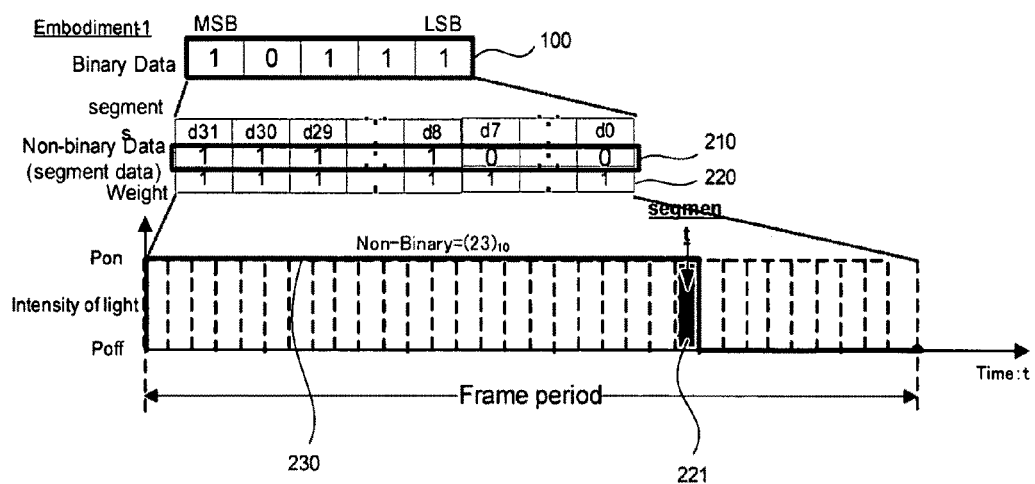
Figure 5C:
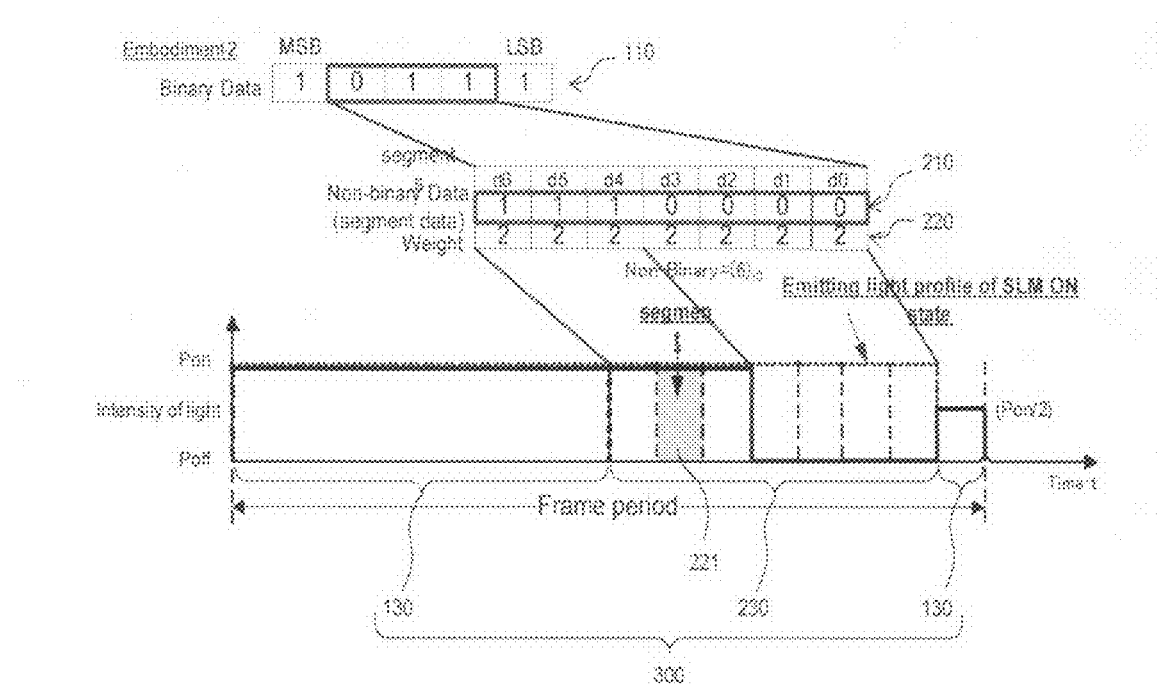

Referring to FIGS. 5A, 5B and 5C, N-bit for showing the application of the binary data to control the pulse width wherein each binary bit of the binary data has a different weighting factor from the least significant bit (LSB) to the most significant bit (MSB). In controlling the grayscale by applying a PWM control as exemplified in FIG. 5A, the weighting factor of each bit is the time duration of applying a pulse control, that is the length of the period of each segment (i.e., sub-frame). FIG. 5A shows a PWM control by applying a binary mirror control signal 130 wherein the ON- or OFF-waveform of PWM control corresponding to the continuous weighting factors 120 for each bit of the binary data 110.

FIG. 5B shows an alternate embodiment wherein the five bits of the input video data are converted into non-binary data with a uniform weighting factor of "1". The 5-bit binary data is converted into non-binary data for each segment and transferred to the SLM, wherein the period of sub-frame is determined by the weight of LSB (weighting=1). In other words, the number of ON states in a period of LSB is calculated and a grayscale is determined according to the non-binary data so as to continue the period of the ON state. FIG. 5B illustrates a case of generating the non-binary data 210 as a bit string of twenty three (23) digits of with each digit applying a uniform weighting factor of "1" (i.e., 16+0+4+2+1=23). This bit string is generated from a 5-bit binary data 110 of "10111" and outputting the non-binary data 210 in "head first", thereby generating a non-binary control signal 230 with continuous-23 ON segments.

FIG. 5C shows another exemplary embodiment wherein the intermediate 3-bit is converted into non-binary data. Therefore, The light intensity modulation (of the light intensity ratio of ½) is performed by the SLM or light source based on the lowest bit of the binary data. As a result, in this embodiment a uniform weighting fact of "2" is applied to all the bits of the binary data except for the MSB. FIG. 5C shows a control method of extracting three bits of "011" at the center from five-bit binary data 110 of "10111" for generating non-binary data 210 that includes a bit string of three digits (i.e., 0+2+1=3) of continuous "1" and assigning "2" as a weighting value 220 for each bit, thereby generating a non-binary mirror control signal 230 by assigning a segment 221, of which the pulse width is extended to two times for each bit. Also generated is a binary mirror control signal 130 having a time period equivalent to eight times of the width of the segment 221 corresponding to the MSB of the binary data 110. To the LSB of the binary data 110, a two times (i.e., 2×) of pulse width corresponding to a width of the segment 221 is assigned and also the light intensity at the time of ON is set at ½. A mirror control signal 300 is generated and inputted to the spatial light modulators 5100. The mirror control signal is a mixture mirror control signal 300 that includes the binary mirror control signal 130 corresponding to the MSB of the binary data 110, the non-binary mirror control signal 230 generated from the non-binary data 210 corresponding to the three bits of "011" at the center, and also the binary mirror control signal 130 corresponding to the LSB of the binary data 110.

Figure 6:
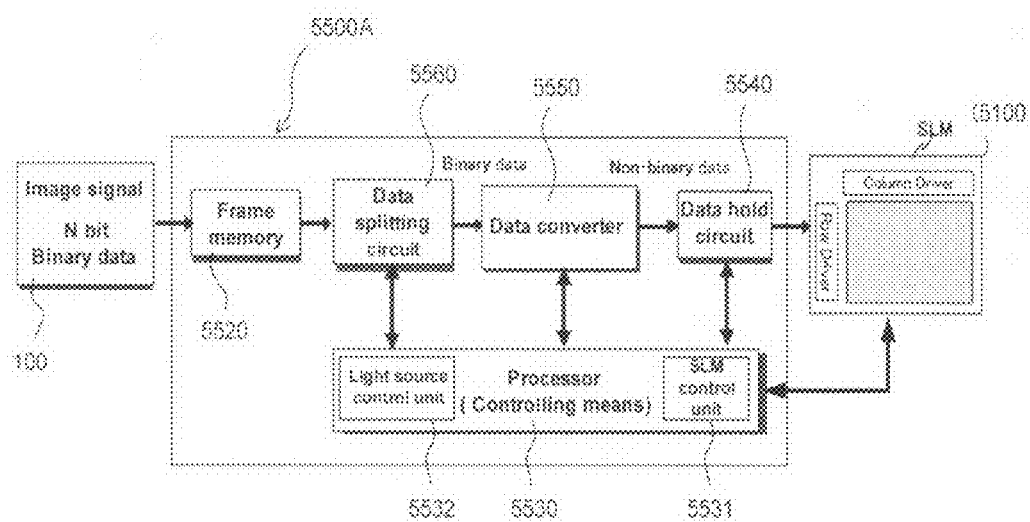
FIG. 6 is a circuit diagram for showing the processes carried out by different functional blocks for applying the non-binary data to a SLM for generating images of different gray scales.

Referring to FIG. 6 for a functional block diagram of a display system that receives an image signal of N-bit binary data for displaying an image with the gray scale based on binary data of image signal. The system further includes a data separation circuit 5560 to divide the binary data into the first data having K sets of M-bit binary data and the second binary data having the residual bits. The system further includes a data converter 5550 for converting the first and second binary data into multiple sets of non-binary segmented data for applying the PWM control as the data for each sub-frame. The system further includes a SLM 5100 having a plurality of pixel elements and each of these pixel elements is controlled with a non-binary data.

The system shown in FIG. 6 applies the following steps to convert the binary input data into the non-binary data:

Step A) calculating a first segment of non-binary data (i.e., the data for controlling the first pixel element) from M-bit binary data corresponding to the first pixel element and transferring the data to the SLM;

Step B) calculating first segment data corresponding to all pixels sequentially and transferring the data to the SLM;

Step C) calculating second segment data (i.e., the data for controlling each pixel) corresponding to all pixels sequentially and transferring the data to the SLM;

Step D) repeating the calculation and transfer of all segmented data (until the entirety of M-bit binary data is converted into non-binary data and transferred to the SLM)

Step E) repeating the above processes listed in the steps A through D for K times (i.e., the number of the first binary data); and Step F) repeating the same process of the steps A through D for the second binary data.

The present embodiment enables a displaying an image with a uniform grayscale in the entire display period as a result of dividing binary data into equal K sets of M-bit binary data by the data divider (i.e., a data-splitting circuit). The present embodiment enables a high-speed control of all pixels in the period of sub-frame corresponding to non-binary data. The data converter 5550 does not require a large memory space for holding non-binary data as a result of converting binary data into non-binary data. The Control unit 5500A shown in FIG. 6 has a data separation circuit 5560 placed at the front stage of the data converter 5550. The data separation circuit 5560 divides the incoming binary data 110 received from the frame memory 5520 and divides the incoming binary data 110 into K pieces of mutually equal binary data and transmits the divided data to the data converter 5550. The data converter 5550 carries out the operation of converting the divided binary data received from the data separation circuit 5560 into non-binary data and storing the non-binary data in the data hold circuit 5540.

Figure 7:
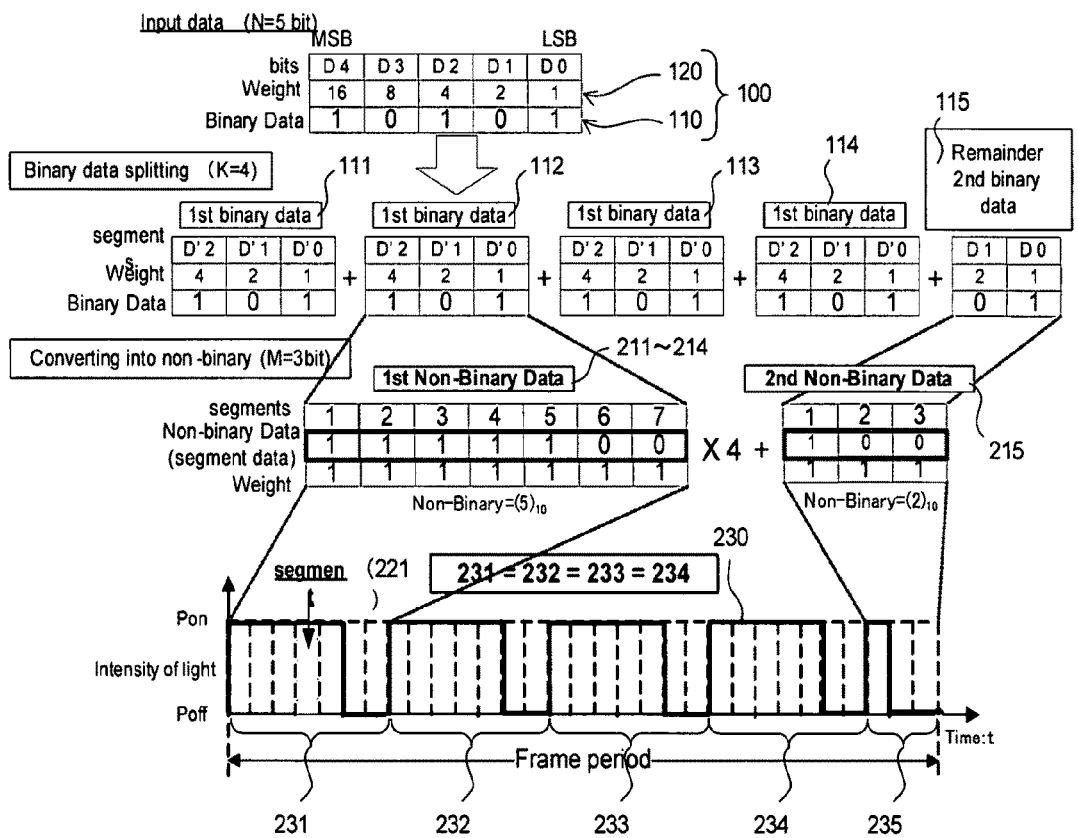
FIG. 7 is a data block diagram for showing the processes on different data segments in the processes of computing non-binary data.

FIG. 7 shows the data block diagrams for illustrating an alternate method to divide the incoming binary data of 5 bits in total into equal four (4) pieces of binary data and the residual 2-bit data. The divided pieces of binary bit-data are converted into non-binary data segment and transferred to the SLM, wherein the period of sub-frame is determined by the weight of LSB (weight=1). In other words, the number of ON states in a period of LSB is calculated and a grayscale is expressed so as to maintain the period of the ON state over the time period as defined by the non-binary data applied a weighting factor of the LSB. As a result, it is possible to show an image displayed with a uniform grayscale in the entire display period as illustrated in FIG. 7. Specifically, FIG. 7 shows the case of K=4. The binary data 110 is divided to "101" that is a quarter (¼) of the original binary data 110 of "10101", and divided into four pieces of the "101" (i.e., the first binary data 111, first binary data 112, first binary data 113 and first binary data 114) and the second binary data 115 is the residual two bits on the LSB side. The first binary data 111 through 114 and second binary data 115 are converted into four pieces of non-binary data 211, 212, 213 and 214, respectively, and one piece of second non-binary data 215. Furthermore, the non-binary mirror control signals 231, 232, 233 and 234 are generated from the first non-binary data 211, 212, 213 and 214, respectively, and a non-binary mirror control signal 235 is generated from the second non-binary data 215; and these signals are inputted to the spatial light modulators 5100.

According to the embodiments of the present invention, it also discloses a data hold circuit 5540 for holding the non-binary data converted by the data converter 5550. The data hold circuit 5540 holds the non-binary data equal to at least $½^a$ of the number of horizontal pixels, where "a" is an integer, and transfers the non-binary data to SLM 5100. Furthermore, in a different embodiment, it discloses an image display system that includes a data hold circuit 5540 for holding the non-binary data converted by the data converter 5550. The data hold circuit 5540 has the capacity to hold the non-binary data for all pixels corresponding to at least the first binary data and non-binary data for all pixels corresponding to the first binary data calculated at the first time. The data converter 5550 does not repeat the calculation of non-binary data corresponding to the first binary data and the hold circuit repetitively transfers the held non-binary data to SLM for K times.

The present embodiment enables a small circuit with relatively small capacity. According to FIG. 7, the memory capacity of the data hold circuit 5540 is the memory of 10 (=7+3) segments for 31 sub-frames. The number of calculations is decreased and the burden of the data converter 5550 is significantly reduced.

Figures 8, 9:
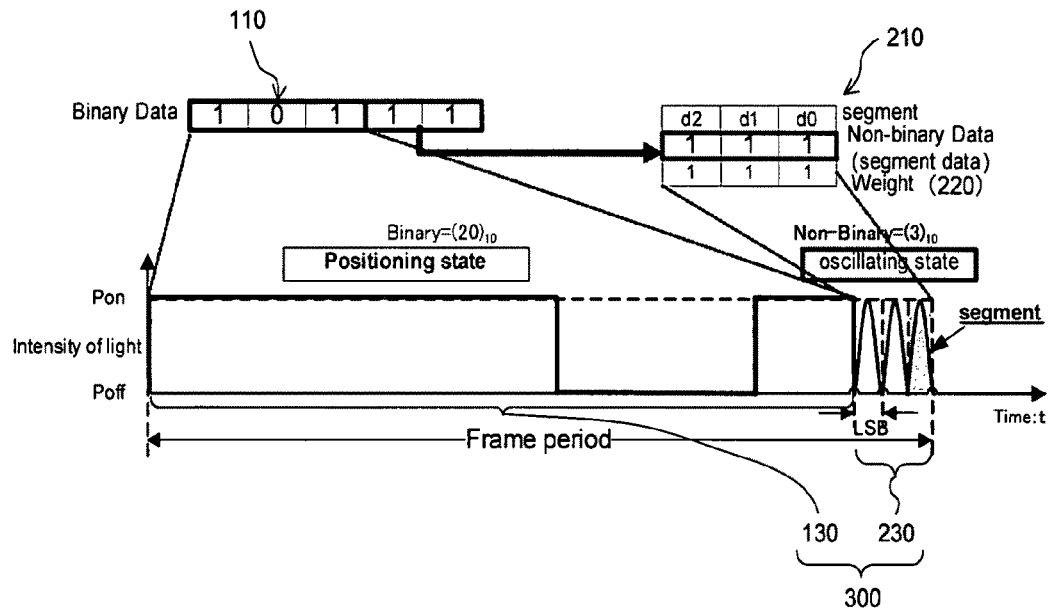
FIG. 8 is a diagram for showing the processes for computing the non-binary data and controlling the light pattern implemented in an image display system of the present invention.
FIG. 9 is a diagram for showing a method of computing the non-binary data implemented in an image display system of the present invention.

FIG. 8 shows the conversion of the binary data into segmented non-binary data as an alternate embodiment to control each element of pixel as a micromirror element with a positioning state or an oscillation state or an intermediate state. The oscillation state or the intermediate state is controlled with a non-binary data. The time requirement for processing is relaxed, because an extension of the time of segment is achieved by modulating the SLM for light with the non-binary data. Specifically, FIG. 8 generates a binary mirror control signal 130 for a PWM from the upper three bits of the five-bit of "10111". The binary mirror control signal 130 is used for ON/OFF-controlling the micromirror 5112. Meanwhile, the lower two bits of "11" of the binary data 110 is converted into three pieces (2+1=3) of non-binary data 210 (with the weighting value of "1" in this case), thereby generating a non-binary mirror control signal 230. The non-binary mirror control signal 230 is used for implementing an oscillation control for the micromirror 5112 or a control at an intermediate position between the ON and OFF positions of the micromirror 5112. Therefore, a mixed mirror control signal 300 that includes the binary mirror control signal 130 and the non-binary control signal 230 controls the modulation of the micromirror 5112.

FIG. 9 shows the data converter converts the data into multiple segmented non-binary data and each of these multiple segments represents a period of the segment constituting an image display sub-frame. Each of these segments is applied a weight factor equals to the LSB of M-bit binary data. The time requirement of processing is relaxed because of the display time of segment of non-binary data. Specifically, in Extracting the center M-bit (i.e., three bits of "010" in this case) from the five-bit binary data 110 of "10101" and converting it into non-binary data 210, the example shown in FIG. 9 generates the non-binary data 210 so as to make a period of "2" that is the weighting value 120 of the lowest bit of three bits as a weighting value 220 on the non-binary data 210 side. The non-binary data 210 generated from the "010" is converted into four (=0*8+1*4+0*2) pieces of bit strings and is converted into a bit string of two-bit (i.e., one half) in consideration of "2" that is a value of a weighting value 220 (i.e., the weighting of the lowest bit of M-bit). The display period by applying the non-binary data corresponding to each segment of the non-binary data 210 and the display period becomes longer and therefore a temporal requirement for the control and calculation processing time in the conversion processing relaxed.

Figure 10:
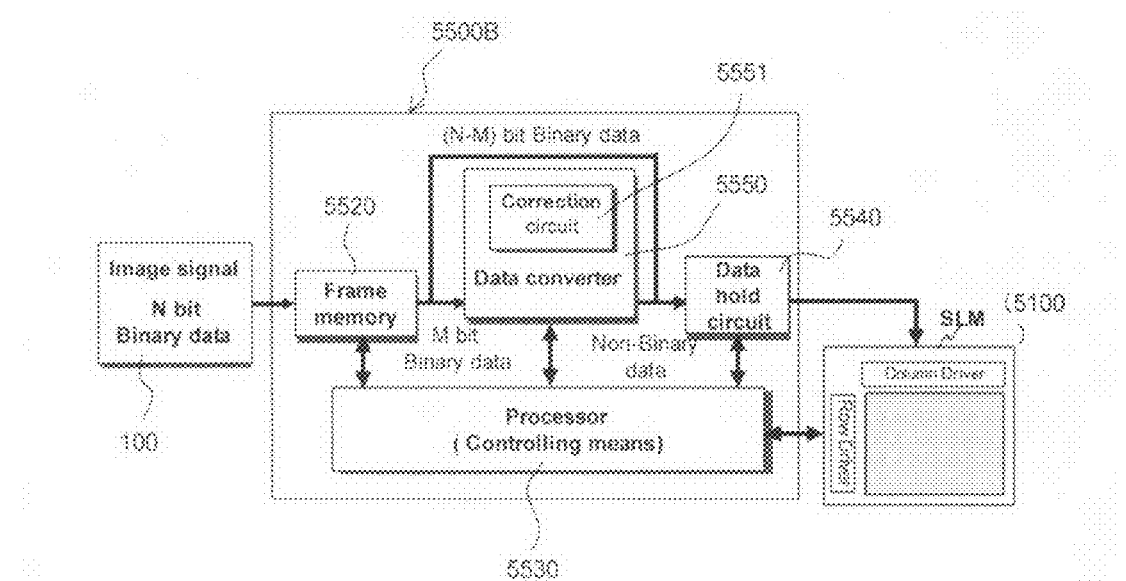
FIG. 10 is a circuit diagram for an image display system implemented with a correction circuit.

FIG. 10 shows a functional block diagram for an image display system implemented with a data converter that includes a correction circuit for image signals. The correction circuit carries out corrections related to image signals or the characteristics of SLM together the repetitive processing of the data converter for each segment. Specifically, FIG. 10 shows a control unit 5500B, which is similar but modified when compared with the control unit 5500. The control unit 5500B is equipped with a correction circuit 5551 in the data converter 5550. The data converter 5550 implements the correction circuit 5551 to carry out a desired correction in the process of the conversion processing from the binary data 110 into non-binary data 210 described above. The correction circuit 5551 provides data for correction of image data that includes the contouring/motion contouring/dither/scaling/I/P conversion/operational error of A/D/operational error of other circuits. Furthermore, the correction circuit 5551 corrects an operational error of a spatial light modulator. The correction circuit 5551 further corrects the unevenness between characteristics of a plurality of elements of spatial light modulator.

Figure 11:
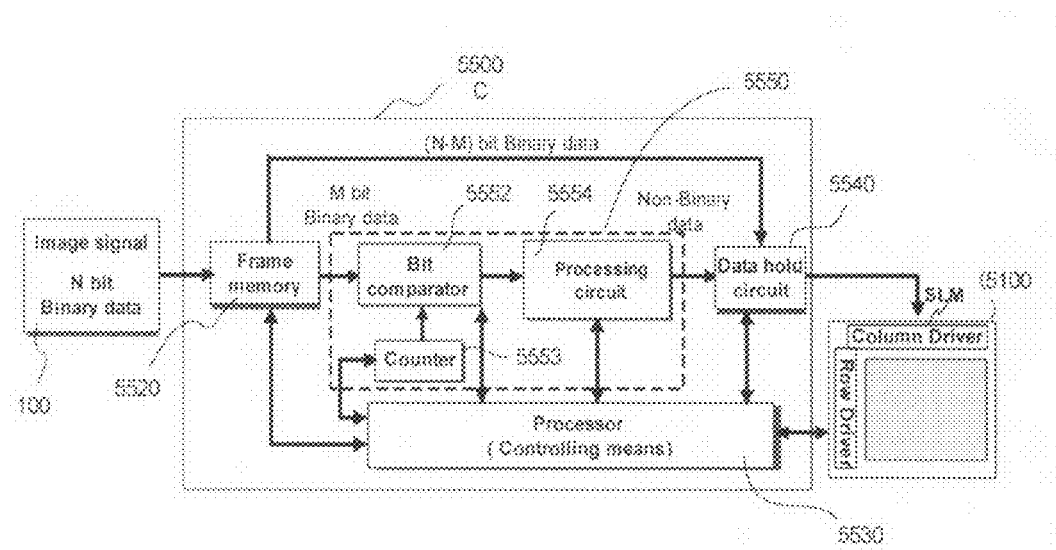
FIG. 11 is a circuit diagram for an image display system implemented with a correction circuit.

FIG. 11 is a functional block for showing an image display system 5000 for displaying images with the grayscale by Applying binary data of image signal that includes Video signal of N-bit binary data. The system further includes at least one counter 5553, which counts the number of segments (i.e., the number of sub-frames) of the calculated non-binary data corresponding to consecutive segments of at least M-bit data (N≧M). The system further includes at least one bit comparator 5552 that compares the M-bit binary data and the segment count generated by the counter. The system further includes a processing circuit 5554 that calculates for each non-binary data segment, i.e., the data for each sub-frame, by applying data generated from the comparator 5552, and applying the non-binary data to control the SLM 5100 that includes multiple pixels.

The non-binary data is generated by the calculations according to the following steps:

A) Calculating a first segment of non-binary data (i.e., the data controlling a first pixel element) from M-bit binary data corresponding to the first pixel element and transferring the data to the SLM 5100;

B) calculating first segment data corresponding to all pixels sequentially and transferring the data to the SLM 5100;

C) Calculating second segment data (i.e., the data for controlling each pixel) corresponding to all pixels sequentially and transferring the data to the SLM 5100; and D) Repeating the calculation and transfer of all segmented data until the entirety of M-bit binary data is converted into non-binary data and the data is transferred to the SLM 5100.

Figure 12:
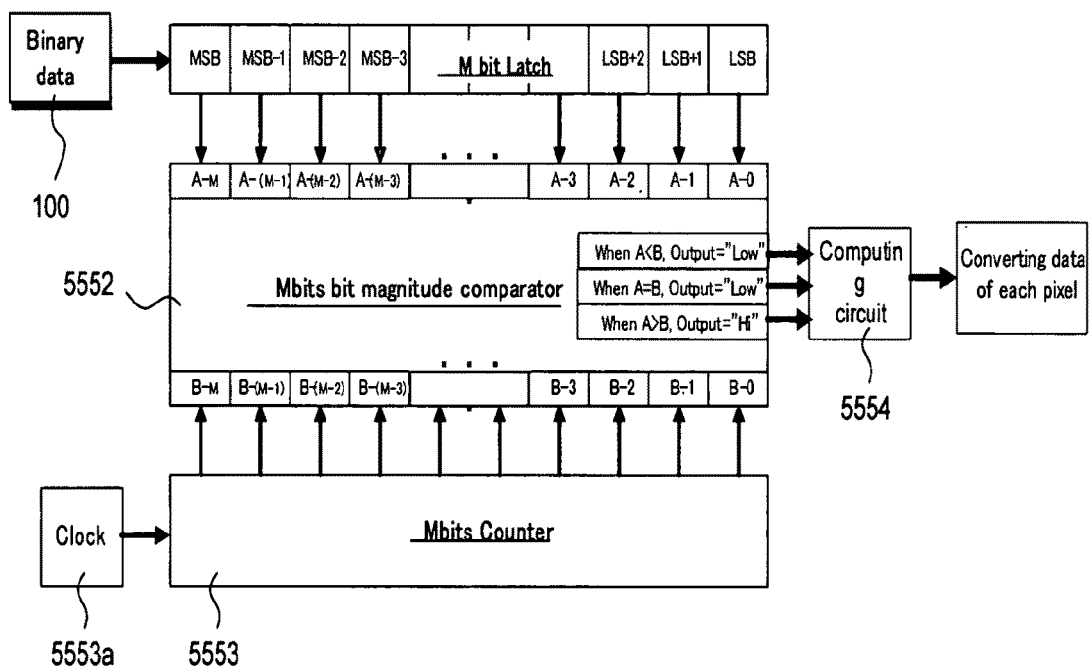
FIG. 12 is a functional block diagram for showing a display system implemented with a counter to count the number of segments of the calculated non-binary data corresponding to a consecutive piece of at least M-bit data.

FIG. 12 shows an M-bit magnitude comparator implemented in the system of FIG. 10. FIG. 12 shows one exemplary embodiment and different subtraction circuits can be used to function as a comparator also. In a control unit 5500C as illustrated in FIG. 11, the data converter 5550 comprises a bit comparator 5552, a counter 5553 and a processing circuit 5554. The counter 5553 is an M-bit counter incremented by a clock 5553a. The bit comparator 5552 compares input M-bit binary data 110 (where A=(A-0) through (A-M)) with an M-bit counter 5553 (where B=(B-0) through (B-M)) for each input of the clock 5553a and outputs "1" or "0" to the processing circuit 5554 based on the relationship of magnitude between the aforementioned two pieces of data. Specifically, the bit comparator 5552 outputs "1" to the processing circuit 5554 if the comparison result is A>B, while outputs "0" to the processing circuit 5554 if the comparison result is A≦B. Therefore, continuous bit string of "1" is outputted to the processing circuit 5554 until the value of the counter 5553 becomes identical to a value of the binary data 110, followed by outputting the bit string of "0" being output to the processing circuit 5554 until the counter 5553 is overflowed. The processing circuit 5554 generates a non-binary mirror control signal 230 from the above-described bit string output from the bit comparator 5552 at the front stage. The control unit 5500C as shown in FIGS. 11 and 12 described above enables a high-speed control of the entire pixels in the period of sub-frame corresponding to non-binary data. This system comprising the control unit 5500C described above does not require a large memory space for holding non-binary data as a result of converting binary data into non-binary data.

Figure 13:
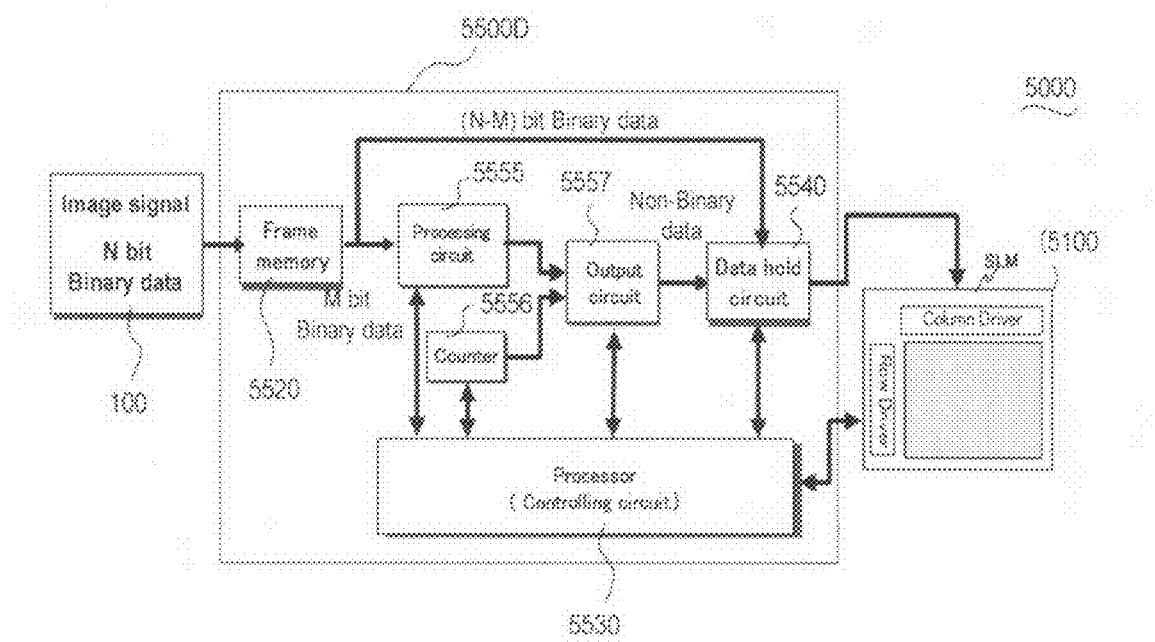
FIG. 13 is a circuit diagram for showing a display system implemented without requiring large memory for holding the non-binary data as a result of converting the binary data into the non-binary data.

FIG. 13 is a functional block diagram to show a configuration of an exemplary image display system 5000 according to a different embodiment of the present invention. In the control unit 5500D shown in FIG. 13, the control unit 5500D is different from the control unit 5500 described above. The control unit 5550D shown in FIG. 13 comprises a processing circuit 5555, a counter 5556 and an output circuit 5557, in addition to the frame memory 5520, controller 5530 includes a data hold circuit 5540. FIG. 13 illustrates an image display system that applies a Video signal received as N-bit binary data 100 in the binary data for showing an image with additional levels of grayscales. The system includes at least one processing circuit 5555, which calculates multiple segmented data as non-binary sub-frames from consecutive segments of M-bit binary data (N≧M). The system further includes at least one counter 5556, which counts the number of processing cycles of the first pixel elements (i.e., the number of non-binary post-calculation segments (i.e., the number of sub-frames)). The system further includes an output circuit 5557 for outputting the segmented non-binary data, i.e., the data of sub-frames, corresponding to the count generated by the counter according to the calculated non-binary data. The system further includes a SLM 5100 that has a plurality of pixel elements with each element controlled by a non-binary data.

The output circuit 5557 performs the following functions:

A) Selecting a first segment of non-binary data, i.e., the data controlling a first pixel element, calculated by the processing circuit corresponding to the first pixel element and transferring the first segment of non-binary data to the SLM 5100;

B) Selecting first segment non-binary data corresponding for all pixels sequentially and transferring the non-binary data to the SLM 5100;

C) Selecting second segment data, i.e., the data for controlling each pixel, corresponding to all pixels sequentially and transferring the data to the SLM 5100; and D) Repeating the operations of calculation and transfer of all segmented data until the entirety of M-bit binary data is converted into non-binary data and transferred to the SLM 5100.

Figure 14:
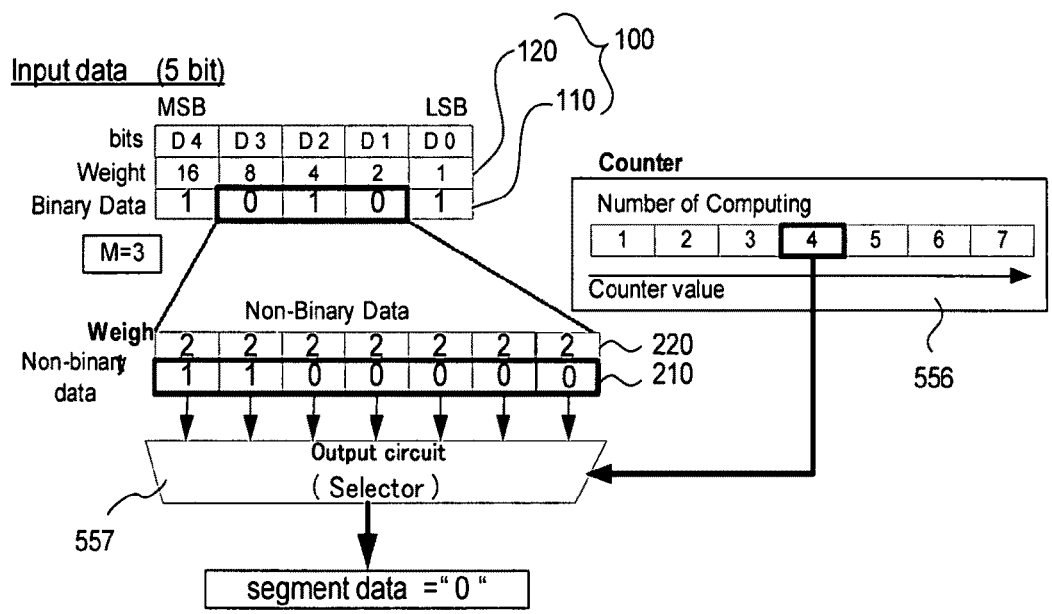
FIG. 14 is a diagram for showing a method implemented in a display system for computing the non-binary data.

FIG. 14 are data block diagrams for showing the process of computing the non-binary data implemented in a system as disclosed in the present invention implemented in the embodiment as shown in FIG. 13. The image display system 5000 includes a control unit 5500D comprising a data holding circuit 5540 that does not require a large amount of memory space for holding non-binary data. The non-binary data is generated from an operation of converting binary data into non-binary data.

Figure 15:
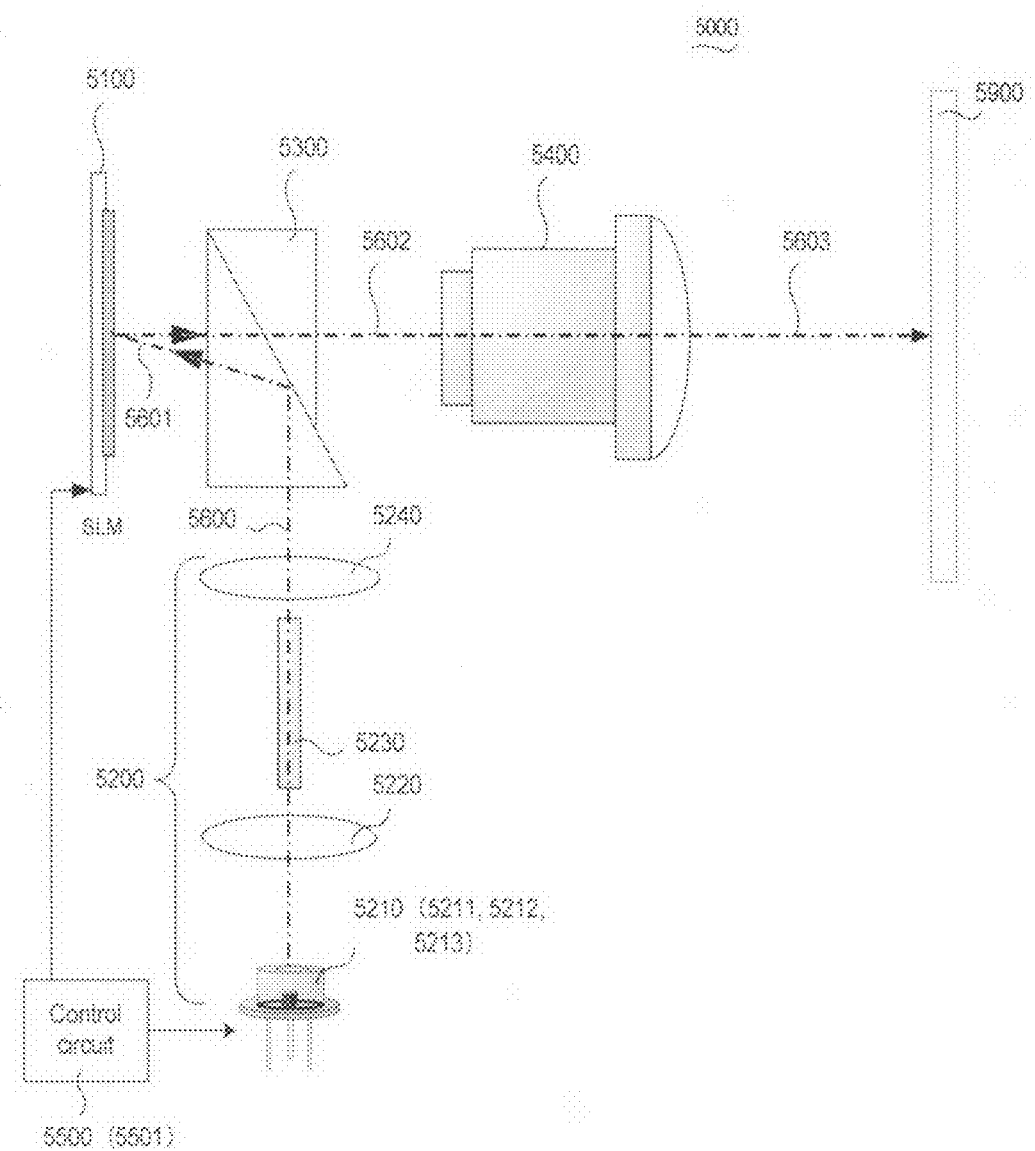
FIG. 15 is a conceptual diagram exemplifying in more details a configuration of an image display system exemplified in FIG. 2.

FIG. 15 is a functional block diagram for conceptually exemplifying in more details a configuration of an image display system depicted in FIG. 2. FIG. 15 shows an image display system 5000 comprises a single spatial light modulator (SLM) 5100, a control unit 5500, a total internal reflection (TIR) prism 5300, a projection optical system 5400, a light source optical system 5200 and a control unit 5500 (or a control unit 5500A, control unit 5500B, control unit 5500C or control unit 5500D). The image display system 5000 is generally referred to as a single-plate image display system 5000 implemented with a single spatial light modulator 5100.

As noted above, the single-plate image display system 5000 is implemented with a single spatial light modulator 5100 for simplicity. However, the methods and techniques as disclosed in the present invention, is applicable to a two-plate image display system implemented with two spatial light modulators or a three-plate image display system implemented with three spatial light modulators.

The single spatial light modulator 5100 and TIR prism 5300 are placed in the optical axis of the projection optical system 5400. The light source optical system 5200 is particularly arranged to project a light with an optical axis intersects with the optical axis of the projection optical system 5400 at a right angle. An illumination light 5600 incident from the light source optical system 5200 placed next to the side of the TIR prism 5300 is projected from the TIR prism 5300 as an incident light 5601 to the spatial light modulator 5100 at a prescribed inclination angle. The TIR prism 5600 further transmits a reflection light 5602 perpendicularly on the spatial light modulator 5100 to reach the projection optical system 5400. The projection optical system 5400 projects the reflection light 5602 reflected from the spatial light modulator 5100 through TIR prism 5300 as projection light 5603, to a screen 5900 or the like.

The light source optical system 5200 comprises a variable light source 5210 for generating the illumination light 5600, to project to a condenser lens 5220 for condensing the illumination light 5600. The light source optical system 5200 further includes a rod type collector body 5230 and a condenser lens 5240. The variable light source 5210, condenser lens 5220 and condenser lens 5240 are placed, in this order along the optical path of the illumination light 5600 emitted from the variable light source 5210 for transmitting onto the side face of the TIR prism 5300. The image display system 5000 is configured to achieve a color display on the screen 5900 in the sequential color system by using a single spatial light modulator 5100. Specifically, the variable light source 5210 includes a red laser light source 5211, a green laser light source 5212 and a blue laser light source 5213. These multiple light sources of different colors allow independent control of an emission state to divide one frame of display data into a plurality of sub-fields, i.e., three sub-fields respectively corresponding to red (R), green (G) and blue (B). In each of these sub-frames, the controller turns on the red laser light source 5211, green laser light source 5212 and blue laser light source 5213, respectively as will be further described below.

Figure 16:
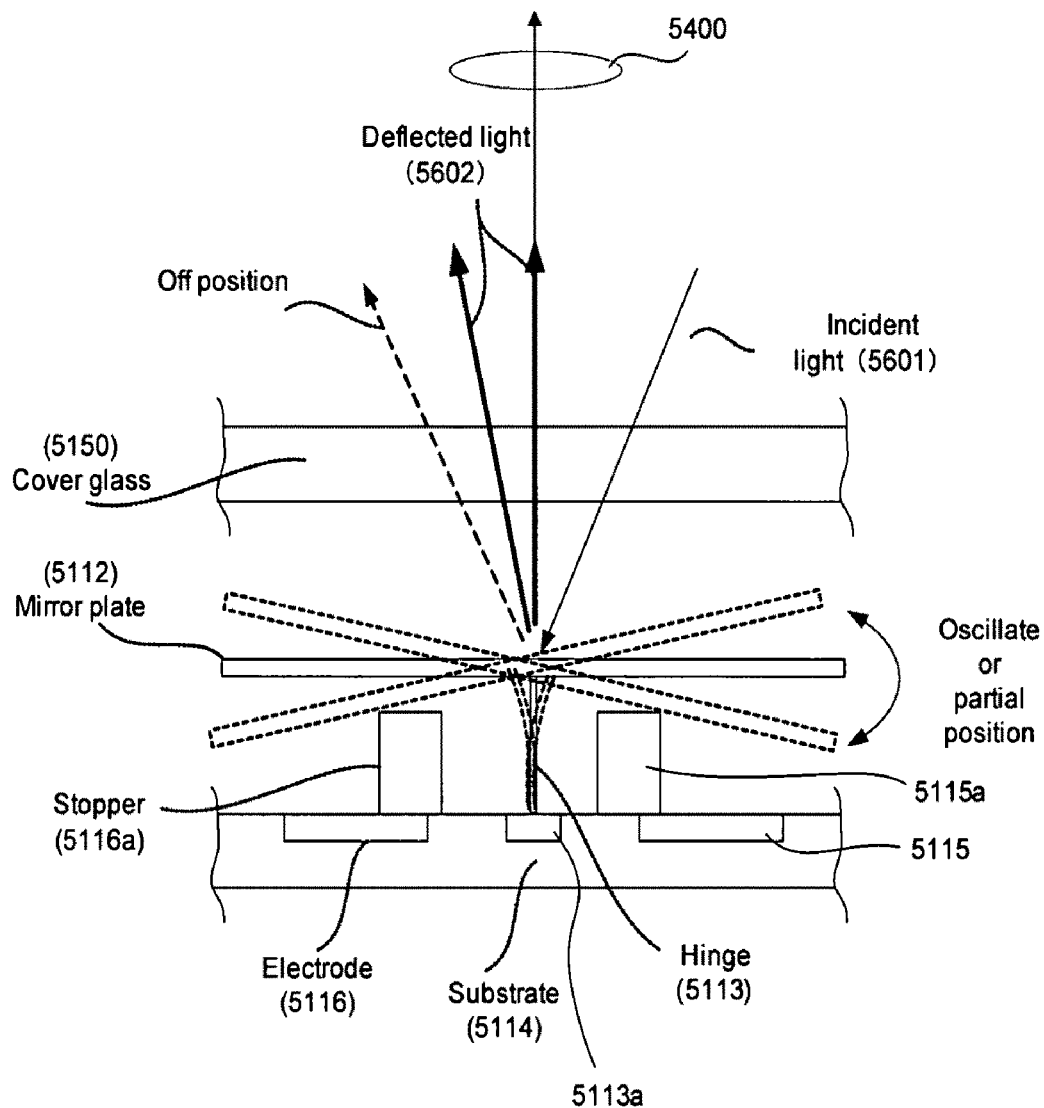
FIG. 16 is a cross-section diagram of individual pixel units constituting a spatial light modulator of an image display system according to a preferred embodiment of the present invention.

FIG. 16 is a cross-section diagram of an individual pixel unit implemented in a spatial light modulator 5100 according to the present embodiment. FIG. 16 shows a mirror element comprises a micromirror 5112 supported on substantially vertical hinge formed on a substrate 5114 to swing freely by inclining to different angular position relative to the hinge 5113. The micromirror 5112 is covered and protected by a cover glass 5150. The mirror element further includes an OFF electrode 5116, an OFF stopper 5116a and an ON electrode 5115, an ON stopper 5115a and these elements are placed at the symmetrical positions around the hinge 5113 disposed at the center on the substrate 5114. And a hinge electrode 5113a is placed under the hinge 5113. By applying a prescribed voltage between the hinge electrode 5113a and OFF electrode 5116, it attracts the micromirror 5112 with a coulomb force to swing the micromirror 5112 to an angular position to come into contact with the OFF stopper 5116a. The micromirror 5112 reflects the incident light 5601 to the light path along an OFF direction away from the optical axis of the projection optical system 5400.

By applying a prescribed potential between the hinge electrode 5113a and ON electrode 5115, the micromirror 5112 is drawn by a coulomb force to swing to another angular position to come into contact with the ON electrode 5115. The micromirror 5112 reflects the incident light 5601 to project along the light path of the ON direction coincides with the optical axis of the projection optical system 5400.

Figure 17A:
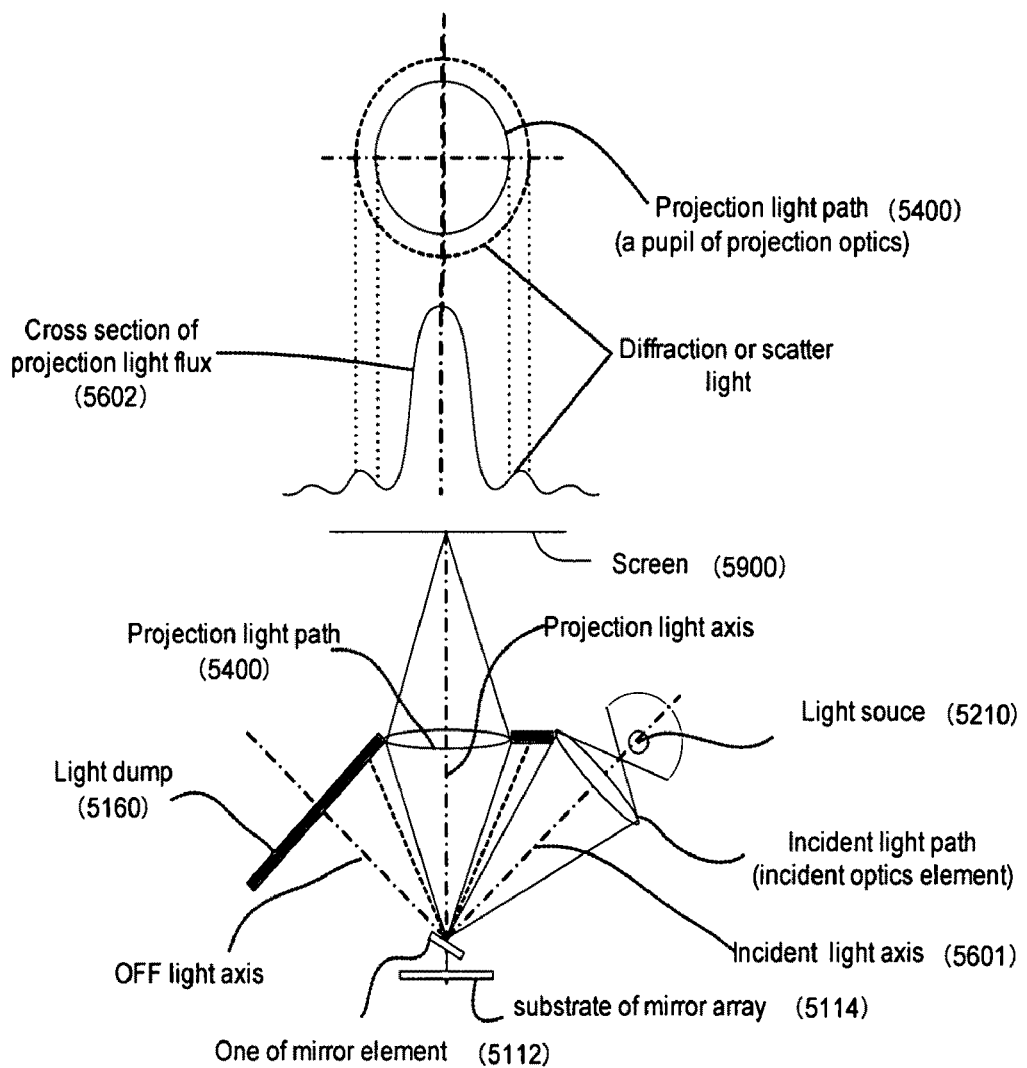
FIG. 17A is a conceptual diagrams showing an example operation of a mirror element in an image display system according to a preferred embodiment of the present invention.
Figure 17B:
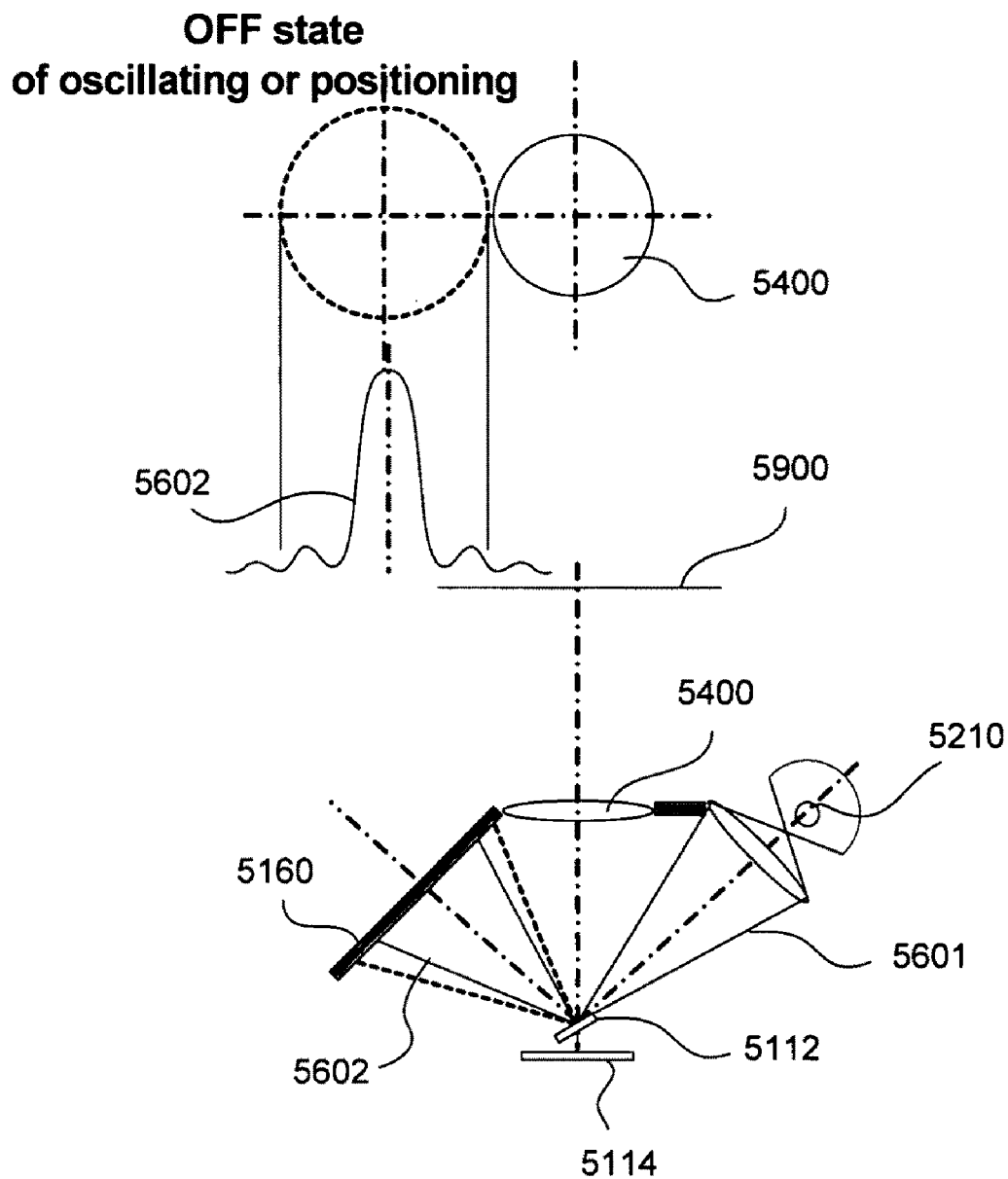
FIG. 17B is a conceptual diagrams showing an example operation of a mirror element in an image display system according to a preferred embodiment of the present invention.
Figure 17C:
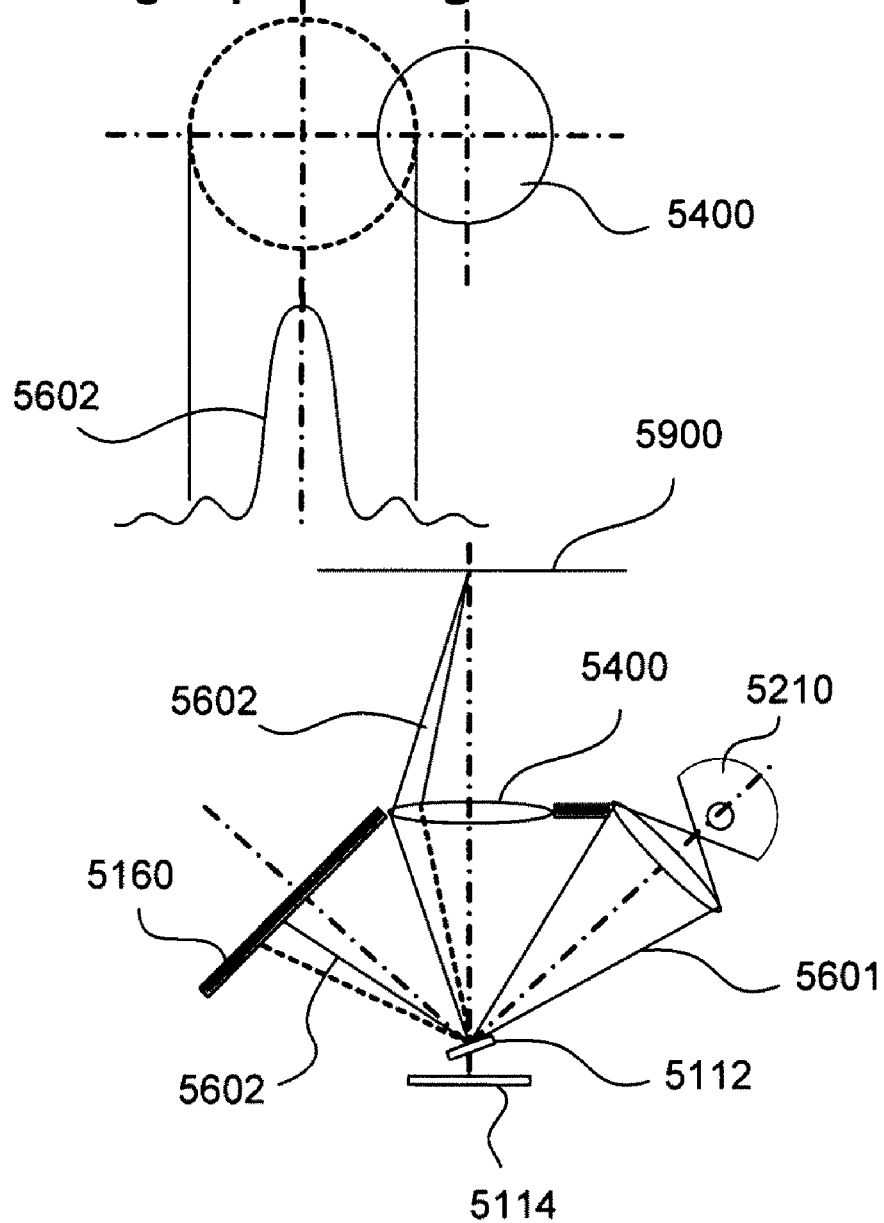
FIG. 17C is a conceptual diagrams showing an example operation of a mirror element in an image display system according to a preferred embodiment of the present invention.

FIGS. 17A, 17B and 17C are diagrams for conceptually showing an exemplary operation of the mirror element 5111 in an image display system according to the present embodiment. FIG. 17A shows an ON state of the micromirror 5112. The micromirror 5112 reflects the incident light 5601 projected from the variable light source 5210 as the reflection light 5602 along the optical axis of the projection optical system 5400. The reflection light 5602 is projected on an optical path coincides with the optical axis of the projection optical system 5400 and projecting the entirety of the reflection light 5602 on the screen 5900.

FIG. 17B shows an OFF state of the micromirror 5112. The light path of the reflection light 5602 is shifted away from the optical axis of the projection optical system 5400 and absorbed by a light absorption body 5160 and therefore the reflection light 5602 is not projected onto the screen 5900. FIG. 17C exemplifies a case of creating an intermediate gray scale (or a half tone) between the ON- and OFF-lights by the oscillation of the micromirror 5112 between the ON state and OFF state. Specifically, a part of the light path of the reflection light 5602 is overlapped with the projection optical system 5400 during the oscillation of the micromirror 5112 when the micromirror is oscillating between the ON and OFF angular positions.

Figure 18A:
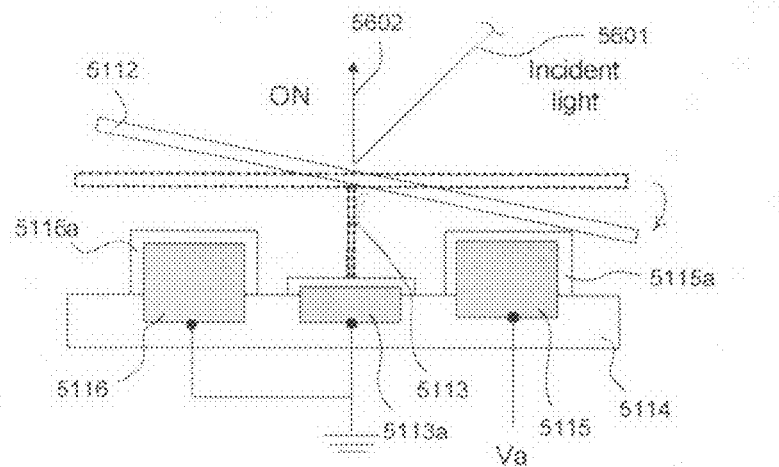
FIG. 18A is a conceptual diagrams showing a method for implementing the ON state of a micromirror.
Figure 18B:
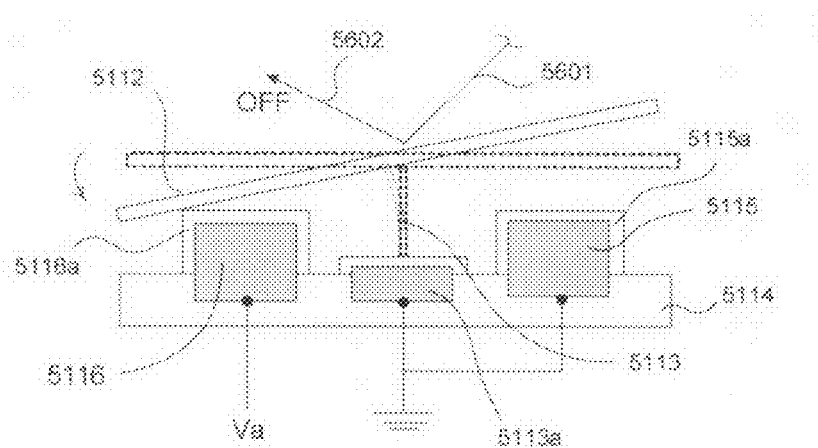
FIG. 18B is a conceptual diagrams showing a method for implementing OFF state of a micromirror.
Figure 18C:
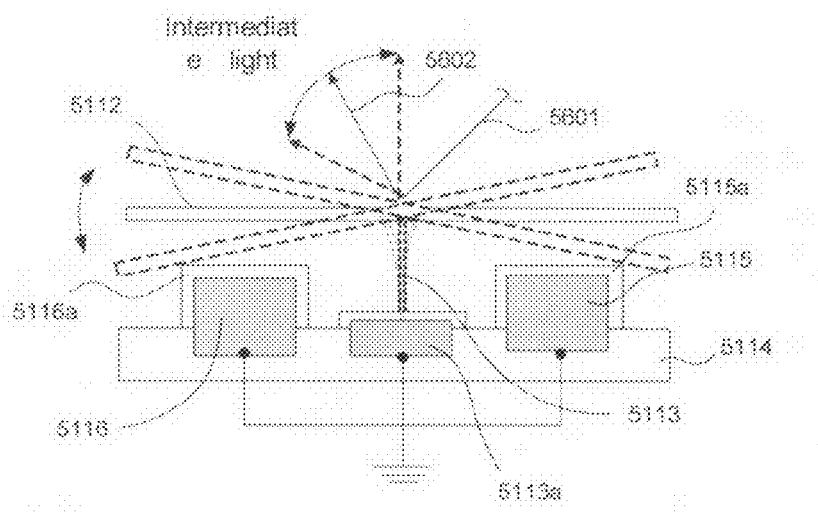
FIG. 18C is a conceptual diagrams showing a method for implementing oscillation state of a micromirror.

FIGS. 18A, 18B and 18C are diagrams for conceptually showing a method for implementing each of the ON state, OFF state and oscillation state of a micromirror 5112 described above. FIG. 18A shows the micromirror is controlled to operate at an ON-state. Based on the binary data 110 and the non-binary data 210, a drive voltage Va (i.e., a charge) is applied to the ON electrode 5115 for attracting the micromirror 5112 with a coulomb force for swinging it to the position to contact with the ON stopper 5115a thus placing the micromirror 5112 in the ON state. FIG. 18B shows the micromirror is controlled to operate at an OFF-state. Based on the binary data 110 and the non-binary data 210, a drive voltage Va (i.e., a charge) is applied to the OFF electrode 5116 for attracting the micromirror 5112 with a coulomb force for swinging it to the position to contact with the OFF stopper 5115b thus placing the micromirror 5112 in the OFF state. FIG. 18C shows the micromirror is controlled to operate at an intermediate-state when the micromirror is oscillating between the ON and OFF states. A ground voltage is applied to both the ON and OFF electrodes 5116a and 5116b. The elastic vibration of the hinge 5113 causes the micromirror 5112 to oscillate between the ON and OFF states for providing a controllable intermediate state.

Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A display system receiving an image signal containing a binary data of N bits, wherein N is a positive integer, for displaying an image with a grayscale corresponding to said binary data, comprising:
a spatial light modulator (SLM); and
a data converter for converting M-bit of said binary data of N-bits for all of said plurality of pixel elements into a non-binary data, wherein M is a positive integer and N≧M≧2, for applying said non-binary data as a sub-frame data in controlling said gray scale for all of said plurality of pixel elements in displaying said image; and
said data converter further carrying out a data conversion process including steps of:
a) calculating a first segment of non-binary data from M-bit binary data corresponding to a first pixel element of the spatial light modulator and transferring the data to the spatial light modulator,
b) calculating first segment data corresponding to all pixels sequentially and transferring the data to the spatial light modulator (SLM);
c) further calculating second segment data corresponding to all pixels sequentially and transferring the data to the spatial light modulator;
d) calculating and transferring all segmented data repeatedly until the entirety of M-bit binary data is converted into non-binary data and the data is transferred to the spatial light modulator.

2. The display system of claim 1 further comprising:
a hold circuit for holding the non-binary data converted by the data converter, wherein
the hold circuit holds the non-binary data for a plurality of horizontal pixels of the spatial light modulator (SLM), and
simultaneously transferring the non-binary data to the spatial light modulator.

3. The display system of claim 1 wherein:
the data converter further includes a correction circuit for an image signal, wherein
the correction circuit performing a correction related to an image signal or characteristics of said spatial light modulator (SLM) during a repetitive process of the data converter in converting said binary data.

4. The display system of claim 1 wherein:
each pixel element of said spatial light modulator (SLM) further comprising a micromirror element controlled by a positioning state or an oscillation state or an intermediate state, and an oscillation state or intermediate state is controlled applying said non-binary data.

5. The display system of claim 1 wherein:
the data converter converts the binary data into said non-binary data by applying a weighting factor equal to a LSB (least significant bit) weighting factor of said M-bit binary data.

6. A display system receiving an image signal containing a binary data of N bits, wherein N is a positive integer, for displaying an image with a grayscale corresponding to said binary data, comprising:
a circuit for dividing the binary data into a first binary data and second binary data includes the residual bits other than the first binary data; and
a data converter for converting the first binary data and second binary data for all of said plurality of pixel elements into multiple sets of segmented non-binary data for applying said non-binary data as a sub-frame data in controlling said gray scale for all of said plurality of pixel elements in displaying said image; and
the data converter further carrying out a data conversion process including steps of:
A) calculating a first segment of non-binary data which controlling the first pixel element, from M-bit binary data corresponding to the first pixel element;
B) calculating first segment data corresponding to all pixels sequentially and transferring the data to the spatial light modulator (SLM);
C) calculating second segment data which controlling each pixel corresponding to all pixels sequentially and transferring the data to the spatial light modulator;

D) repeating the calculation and transfer of all segmented data until the entirety of M-bit binary data is converted into non-binary data and the data is transferred to the spatial light modulator;

E) repeating the above processes listed in the steps A through D for K times (i.e., the number of pieces of the first binary data); and F) repeating the same process of the steps A through D for the second binary data.

7. The display system of claim 6, further comprising a hold circuit for holding the non-binary data converted by the data converter, wherein the hold circuit has a capacity for holding the non-binary data for all pixels corresponding to at least the first binary data and the non-binary data for all pixels corresponding to the first binary data calculated right before said non-binary data transferred to said hold circuit, and the hold circuit further repetitively transfers non-binary data held therein to said spatial light modulator (SLM).

8. The display system of claim 7 wherein:

said hold circuit further repetitively transfers at least twice the non-binary data held therein to each of said pixel elements of said spatial light modulator (SLM).

9. The display system of claim 6, wherein:

the data converter further includes a correction circuit for correcting an image signal, wherein the correction circuit performs a correction related to an image signal or characteristics of said spatial light modulator (SLM) during a repetitive process of the data converter in converting said binary data.

10. The display system of claim 6, wherein:

each pixel element of said spatial light modulator (SLM) further comprising a micromirror element controlled by a positioning state or an oscillation state or an intermediate state, and an oscillation state or intermediate state is controlled applying said non-binary data.

11. The display system of claim 6, wherein:

the data converter converts the binary data into said non-binary data by applying a weighting factor equal to a LSB (least significant bit) weighting factor of said M-bit binary data.

12. A display system receiving an image signal containing a binary data of N bits, wherein N is a positive integer, for displaying an image with a grayscale corresponding to said binary data, comprising:

a spatial light modulator (SLM) having a plurality of pixel elements;

a counter for counting a number of segments or a number of sub-frames of calculated non-binary data corresponding to a consecutive segment of at least M-bit data wherein M is a positive integer and $N \geq M \geq 2$;

a bit comparator for comparing the M-bit binary data with the count of the counter for generating the non-binary data corresponding to the M-bits for all the pixel elements of said SLM;

a processing circuit for carrying out a calculation using said non-binary;

the spatial light modulator (SLM) further receiving and applying said non-binary data generated by said bit comparator to control said pixel elements; and the processing circuit performs following functions of:

A) calculating a first segment of non-binary data which controlling the first pixel element, from M-bit binary data corresponding to the first pixel element and transferring the data to the spatial light modulator (SLM);

B) calculating first segment data corresponding to all pixels sequentially and transferring the data to the spatial light modulator;

C) calculating second segment data which controlling each pixel corresponding to all pixels sequentially and transferring the data to the spatial light modulator;

D) repeating the calculation and transfer of all segmented data until the entirety of M-bit binary data is converted into non-binary data and the data is transferred to the spatial light modulator.

* * * * *